Figure 2:
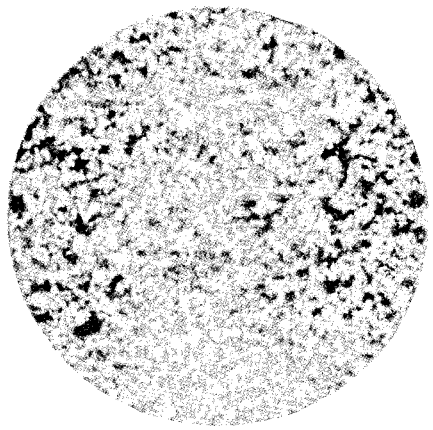

Aug. 22, 1961  H. B. MILLER  2,997,451
CONDUCTIVE PHONOGRAPH RECORD CONTAINING
THERMOPLASTIC RESIN AND CARBON BLACK
Filed March 7, 1957  5 Sheets-Sheet 1

INVENTOR.
Harry B. Miller
BY McCoy, Greene + LeBlanc
ATTORNEYS

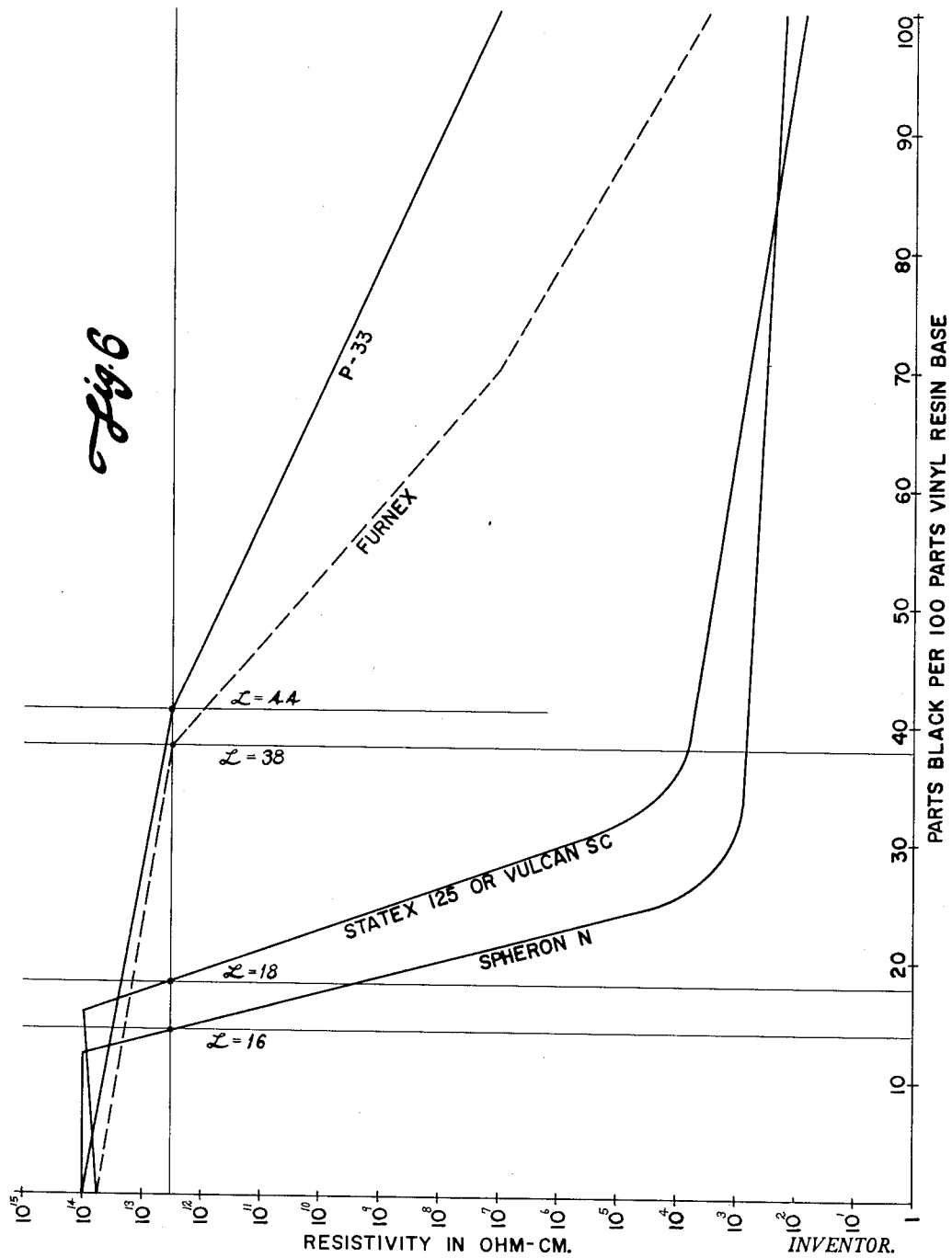

United States Patent Office 2,997,451
Patented Aug. 22, 1961

2,997,451
CONDUCTIVE PHONOGRAPH RECORD CONTAINING THERMOPLASTIC RESIN AND CARBON BLACK
Harry B. Miller, Cleveland Heights, Ohio
(1385 Monroe Ave., Rochester 18, N.Y.)
Filed Mar. 7, 1957, Ser. No. 644,495
1 Claim. (Cl. 260—41)

The present invention relates to phonograph playing records. The present application is a continuation-in-part of application, Serial No. 312,294, filed September 30, 1952, which, in turn, is a continuation-in-part of application Serial No. 677,896, filed June 19, 1946.

The playing of phonograph records is accompanied by spurious noises, commonly called background noise. This background noise is usually constituted of two components having different origins. The first of these components, sometimes called surface hiss, arises inherently out of the very nature of the material of which the phonograph record is constituted. As the stylus travels over the record groove, it naturally and inherently reproduces not only the signal modulations recorded therein, but also noises resulting from the surface irregularities that are present and that would cause noise even in an unmodulated groove. The second component, as will hereinafter be more fully explained, arises out of factors extraneous to the record itself.

In some types of playing record, the magnitude of the second component is so small compared to that of the first component that its effect upon the listener is negligible. This is true, for example, of rigid, breakable, so called "shellac" records, the base of which is constituted roughly of 80% diatomaceous-earth filler and 20% shellac matrix.

In other types of playing record, however, of the flexible, break-resistant type, the magnitude of the first component is relatively so small that the second component becomes the predominant source of annoyance to the listener. The annoyance is increased by the fact that the second component, unlike the first, which is of the nature of a steady hiss, is intermittent, resulting in a crackling sound. Records of this flexible, break-resistant type become easily electrically charged during their playing and even during mere handling.

I have discovered that a very important source of the second component of noise with records of this type resides in the dirt, dust, lint and other particles that become attracted to the record upon its becoming electrically charged during handling and normal usage. When, for example, the playing records are withdrawn from or inserted into record albums, jackets or holders, or are rubbed upon fabric surfaces, they become electrostatically charged and attract dust, dirt, lint and other particles originating either in the air or on the surfaces upon which the records are placed. Not only is the appearance of the records undesirably marred by the presence of these particles but, in addition, when the records are played, the stylus grinds some of these particles into the record grooves. This results not only in deeply driving the particles tightly into, and, in some cases, permanently embedding them in, the material of the record, in the walls of the grooves thereof, but also, in some cases, it produces an abrasive action that wears down these groove walls. This constitutes one of the causes of the increased background noise in records after they have been played. In time, moreover, as the record is played more and more, it becomes more and more objectionable, due to the noise becoming progressively increased.

Numerous attempts have been made to solve these problems. It has been proposed, as an illustration, to wash the phonograph playing record, thereby to attempt to dislodge the dust, dirt, lint or other particles. Though washing will remove some of the particles on at least the ridges of the records, it cannot, however, remove such particles as become lodged in the walls of the grooves in the depths of the record, particularly where the particles are held by electrostatic forces, or have become deeply imbedded into the walls of the grooves by the pressure of the playing stylus. Another proposal has involved brushing the records. Brushing, however, cannot remove particles that have been worn into the grooves. It has been proposed to render the record conductive, as with the aid of powdered carbon and other conducting particles, but the results have been unsuccessful.

In the manufacture of a phonograph record, it is essential that the record material have good flow properties in order to completely fill the mold and take the fine impressions of the grooves, and that it have substantial resistance to impact or breakage, i.e., have flexibility or lack of brittleness.

When in the past attempts were made to render the record conductive to prevent, particularly on a dry day, dust lint, and the like collecting thereon, the molding or flow properties of the record material, or the impact resistance or flexibility of the finished record were greatly impaired.

An object of the present invention, therefore, is to provide a new and improved phonograph playing record of the above-described flexible break-resistant type that shall not be dust-attracting.

Other objects are explained hereinafter, and will be particularly pointed out in the appended claim.

I have found that different carbon blacks, often referred to simply as blacks, have different effects when incorporated into the resinous base material forming the record, and that the amount of black required to produce conductivity in the record sufficient to prevent the attraction of dust particles depends on a number of factors, including the three fundamental properties of any black, namely, particles diameter, pH, and structure index or oil absorption index, as well as the plasticity or flow viscosity of the base material.

The present invention is directed principally to a phonograph playing record of the flexible break-resistant type the base of which is constituted of a material that, though it would otherwise electrostatically attract dust and dirt particles, is combined with suitable proportions of a suitable conducting material such as a black having the property that it provides the base with relatively long electric paths by way of the conducting material in order to render the record sufficiently conductive to prevent it from electrostatically attracting dust and dirt particles, thereby, by minimizing the accumulation of dust and dirt particles in the stylus-receiving grooves of the record, reducing correspondingly the background noise of the record, the proportions of the conducting material and other ingredients being so chosen, however, as to produce this result without rendering the record brittle. The conductive material may be disposed throughout the base material of the record, or it may be provided in the form of a surface or sub-surface layer.

Figure 1:
Figure 4:
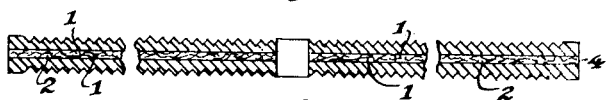
Figure 3:
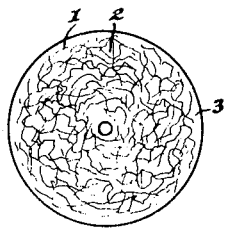

The invention will now be more fully described in connection with the accompanying drawings, in which FIG. 1 is an enlarged transverse cross-section, with inner parts broken away, of a playing record embodying relatively long electric paths of acetylene black, shown diagrammatically extending throughout the body of the record; FIG. 2 is a photomicrograph of the same; FIG. 3 is a plan, upon a reduced scale, diagrammatically showing the relatively long electric paths on the surface of a playing record; FIG. 4 is a section similar to FIG.

Figure 5:
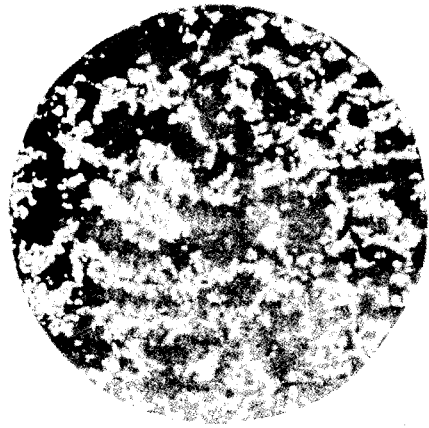

1 of a record embodying a sub-surface layer; and FIG. 5 is a photomicrograph similar to FIG. 2 of a record containing long electric paths of graphite.

In some cases it is considered desirable to use large amounts of carbon black, for example in order to decrease the cost of the record by the use of the relatively low-cost carbon black, whereas in other cases the amount of black in the record material is preferably about the minimum amount, or slightly in excess thereof. In general I have found that the larger the particle diameter, the higher are the proportions required for the minimum or threshold conductivity. On the other hand, the larger the structure index or oil absorption index, and the larger the pH, the lower is the amount of black required for minimum conductivity. The minimum conductivity should have a resistivity value between $10^{12}$ and $10^{13}$ ohm-cm. After much experimentation with various blacks I have found that an empirical relation exists by which the minimum amount of black can readily be determined for any black provided the properties of that black, i.e., particle size, structure index or oil absorption index, and pH are known.

The maximum amount of black that can be used depends on the brittleness of the finished record and the viscosity of the record material in the record press or mold. If too much black is used in a particular resin base, the record material will not fill the mold properly, or the finished record will become fragile. The maximum amount of black suitable is roughly about four times the required minimum value. When suitable plasticizers, lubricants, or extenders are incorporated in the base resin the upper limit can be substantially increased.

In a material having a resinous base selected from polyvinyl and vinylidene halides and their copolymers, polyvinyl esters, and polyvinyl acetals (including formals, butyrals, etc.), the minimum loading L, for threshold conductivity, in 100 parts of resinous base is shown by my empirical formula:

$$L = 136 \cdot \frac{\sqrt[4]{d}}{\sqrt{\text{Oil} \cdot \sqrt[8]{\text{pH}}}} \cdot \sqrt[4]{A} \cdot \sqrt[8]{B}$$

where $d$ is the effective particle diameter in m$\mu$ or milli microns, i.e. the mean particle value as modified by the iodine surface factor only, as hereinafter described; where Oil means the oil absorption index in cubic centimeters per 100 grams; where pH is well known and ranges from about 3.5 to about 10; where $$\sqrt[4]{A}$$

is a correction factor for the particle diameter term, A being equal to $$\left(1 - \frac{1}{2} \log_{10} \frac{d}{28}\right)$$

which $$\sqrt[4]{A}$$

factor can be ignored except when $d$ becomes higher than about 45 m$\mu$; where $$\sqrt[8]{B}$$

is a correction factor for the oil absorption index, B being equal to $$\frac{\text{structure index}}{100}$$

which $$\sqrt[8]{B}$$

factor can be ignored except when the structure index is well into the super-normal range, namely greater than about 135; and where structure index, when not given explicitly, can be found to a close enough approximation for use in the $$\sqrt[8]{B}$$

formula from the relation $$\text{Structure index} \cong \frac{1}{15} \cdot \text{Oil} \cdot \sqrt{d} \cdot \sqrt{A} \cdot \sqrt{\text{pH}}$$

as will be discussed below; and where 136 is a constant that holds for a base resin constituted primarily of a vinyl chloride resin as described below. Sometimes the mean particle diameter is not published and so must be determined from the related factor, specific surface, preferably as measured by the electron microscope.

When the base resin is some other resin than the vinyl resins above designated, as for example a styrene resin as described below, the constant 136 in the L-formula is preferably increased by about 10% to about the value 150. Hence the formula would become $$L = 150 \cdot \frac{\sqrt[4]{d}}{\text{Oil} \cdot \sqrt[8]{\text{pH}}} \cdot \sqrt[4]{A} \cdot \sqrt[8]{B}$$

The oil absorption index is a measure of the amount of oil needed to wet down a given weight of black. The end point is reached when a single ball of a specified stiff paste of the black is formed. This procedure is generally known as the Gardner method. The oil absorption index is commonly expressed either in cubic centimeters per 100 grams or gallons per 100 pounds.

The structure index is a classification which evaluates the extent of reticulate-chain or network structure present in any given carbon. The structure index is often described as a modified oil absorption index which correlates oil absorption with particle size. For example, a channel process black of normal structure index may show a very high oil absorption, because the particle size is very small. The normal value 100 of structure index is effective in producing conductivity. A super-normal value, such as 135, is very effective. A subnormal value, such as 65, is less effective. A more complete discussion of structure index will be found in the following references: Sweitzer and Goodrich, "Rubber Age" (N.Y.), vol. 55, No. 5, p. 469 et seq., August 1944; Sweitzer, Venuto, and Estelow, "Paint, Oil and Chemical Review," vol. 115, No. 8, p. 22 et seq., April 10, 1952; Sweitzer, "Proceedings of the Institution of the Rubber Industry," vol. 2, No. 3, published in 1955; and Wiegand, "Canadian Chemistry and Process Industries," vol. 28, No. 3, p. 151 et seq., March 1944.

In addition, I have observed that a simple quantitative relation exists between structure index on the one hand and oil absorption index, particle diameter, and pH on the other hand. This relation holds very well for super-normal values of structure index, namely values greater than about 110, and for normal values of structure index, namely values of about 100. It holds less well for sub-normal values of structure index, namely values less than about 90, but holds very well again when the numerical constant is modified as described below. The observed relation is:

$$\text{Structure index} = \frac{1}{15} \cdot \text{Oil} \cdot \sqrt{d} \cdot \sqrt{A} \cdot \sqrt{\text{pH}}$$

where Oil, $d$, A and pH are as above defined.

Since many carbon black manufacturers do not yet publish structure index values, the above relation can be used to predict the structure index value. The practical use of this value, of course, is as a measure of the strong or weak persistence of carbon networks in rubber or plastics after milling. The value is determined experimentally from consideration of both the stiff-paste oil test and the appearance under the electron microscope of the carbon-in-vehicle networks.

In addition, when the oil absorption index is not published but the structure index is known, the above relation can be used to roughly predict the oil absorption index. This procedure is also useful when the structure index, as well, is not published but is judged to be in the normal range, namely about 100, as is very frequently the case with blacks manufactured by the channel process.

As an illustration, acetylene black is described in the "Paint, Oil, and Chemical Review" article of April 1952 above as having an oil absorption index of 38 gallons per 100 pounds which is about 320 cc. per 100 grams; a mean particle diameter of 45 m$\mu$; a pH of 6.5; and a structure index of 400. The calculated value of structure index is $$\frac{1}{15} \cdot 320 \cdot \sqrt{45} \cdot \sqrt{1 - \frac{1}{2} \log \frac{45}{28}} \cdot \sqrt{6.5} =$$

$$\frac{1}{15} \cdot 320 \cdot 6.73 \cdot 0.95 \cdot 2.56 = 350$$

This is close enough for the purposes of the present application.

As a further illustration, Vulcan SC is described in the Godfrey L. Cabot, Inc., brochure of January 1955, "Typical Properties of Cabot Rubber Blacks," as having an oil absorption index of 150 cc. per 100 grams; a mean particle diameter of 21 m$\mu$; and a pH of 8. No structure index is given. The calculated value of structure index is $$\frac{1}{15} \cdot 150 \cdot \sqrt{21} \cdot \sqrt{1 - \frac{1}{2} \log \frac{21}{28}} \cdot \sqrt{8}$$

$$= \frac{1}{15} \cdot 150 \cdot 4.6 \cdot 1.03 \cdot 2.83 = 134$$

When the structure index is known to be or judged to be in the subnormal range, say 60 or 65, the preferred relation is:

$$\text{Structure index} = \frac{1}{20} \cdot \text{Oil} \cdot \sqrt{d} \cdot \sqrt{A} \cdot \sqrt{\text{pH}}$$

Blacks manufactured by the thermal process, for example, are found to follow this relation. As an illustration, an FT thermal process black may have a mean particle diameter of about 178 m$\mu$, a pH of about 8.9, an oil absorption index of about 41 cc. per 100 grams, and a structure index of about 65. The calculated value of oil absorption index is:

$$65 = \frac{1}{20} \cdot \text{Oil} \cdot \sqrt{179} \cdot \sqrt{1 - \frac{1}{2} \log \frac{179}{28}} \cdot \sqrt{8.9}$$

$$= \frac{1}{20} \cdot \text{Oil} \cdot 13.4 \cdot 0.776 \cdot 2.98$$

The oil absorption index solves to be 42 cc. per 100 grams, which is quite close to the given value of 41 cc.

The particle diameter $d$ is a measure of the fineness of a black. A related factor is iodine specific surface, sometimes called nitrogen or nitrogen-iodine surface. In general, the product of the mean particle diameter in m$\mu$ and the iodine surface in square meters per gram, is about 2200. When the product is in the range of about 4000 to 6000, or greater, due to particle porosity, and the volatile content of the black is about 2% or lower, the *effective* particle diameter for resistivity calculations is somewhat lower than the nominal value. Hence the $d$ to be used in the L-formula should preferably be reduced by about 27% to 40% in the two cases 4000 and 6000.

The reason for this is that if a black is initially a spherical particle having a $d$ of about 30 m$\mu$ and it is partially "eaten away," by partial combustion or other means, it becomes pock-marked and hence can have a much larger available surface, available not only to oil but to plastic resins as well. As an extreme case, consider 3 pairs of dumbbells, joined perpendicular to each other. Each pair consists of 2 spheres of diameter 12 m$\mu$, joined by a thin rod. This cluster of 6 spheres acts in some respects like a single sphere having a $d$ of about 30 m$\mu$, and in other respects like a cluster of spheres each having a $d$ of about 12 m$\mu$. The iodine surface test is able to probe this situation and help determine what is the *effective* particle diameter of such a black, as regards resistivity, which in this case would be less than 30 m$\mu$ but greater than 12 m$\mu$. The rule for reduction of nominal $d$ to effective $d$ is given by the product of iodine surface and nominal $d$, as discussed above, and is roughly as follows: If the product is about 4000, lower $d$ by 27%; if about 5000, lower $d$ by 33%; if about 6000, lower $d$ by about 40%; etc. That is, divide the product by 150 to get the percentage number.

The pH serves as a general guide to purity of surface and hence of closeness of contact between carbon particles. Low pH signifies high volatile and hence high contact resistance. This low or acid pH is due to carboxyl groups on the carbon surface. The channel process, using an oxidizing atmosphere, leads to an oxidized surface on the carbon with resultant high volatile and acid pH, covering the range from about 5 to about 2. Higher pH, e.g. neutral pH, signifies low volatile and a neutral or very pure surface. This is typical of the thermal process, where the pH ranges from about 7 to about 8, or even 9. When the pH is found to be higher than neutral, e.g. definitely alkaline, the reason is often due to carbonate salts supplied by the spray water. This is typical of the furnace process, where the volatile and hence contact resistance are low and where the pH ranges from about 8 to about 10. The only other contamination is traces of oily impurities on the particle surface, ocurring in both the thermal and furnace processes.

The volatile content and the iodine surface are not listed in the recipes below except when the product of particle diameter and iodine surface is 4000 or greater, and the volatile is 2% or less (implying a neutral or alkaline pH).

A playing record in accordance wth the present invention, for example, may be manufactured by mixing a base material of the above-described flexible break-resistant type with a suitable proportion of a suitable black.

The resinous base material may be varied greatly as hereinafter described but the preferred base materials are polyvinyl compounds selected from polyvinyl halides, vinyl esters, vinyl acetals, and aromatic vinyl derivatives, such as polyvinyl chloride and its copolymers with vinyl acetate or vinylidene chloride, and such as polystyrene and copolymers of a styrene.

A suitable base material may as aforesaid be constituted of a vinyl resin, including polyvinyl chloride, and vinyl chloride copolymerized with a smaller quantity of, for example, vinyl acetate, vinylidene chloride, acrylonitrile, maleic anhydride or a combination of the same. The base may be constituted of "Vinylite" comprising a copolymer of vinyl chloride and vinyl acetate containing about 87% to 89% copolymerized vinyl chloride, or of "Geon," comprising a copolymer of vinyl chloride and vinylidene chloride. It may be mixed with suitable plasticizers, pigments, binders, fillers, extenders, stabilizers, lubricants, dyes and other additives.

A base material of this character, shown white at 2, FIG. 1, is insulating. In the absence of a suitable proportion of the acetylene black, Statex 125, or other suitable black, therefore, it will attract dust, dirt, lint and the like. The particles of acetylene black, Statex 125, or other suitable black become distributed throughout the base in the form of long branch-like aggregates interconnected with one another, as shown black at 1 in FIG. 1, that provide long continuous electric paths. These paths render the base sufficiently conductive to prevent it from electrostatically attracting dust, dirt particles and the like. Even if some of the long chains should become broken during milling, the very high capacitance between the broken parts will also be very effective in reducing the surface-charge-density that would otherwise exist on the surface of the base. The term "electric paths" or its equivalent will, therefore, be used herein to include broken paths of this nature. With the base of the record rendered conductive by the black, the accumulation of dust and dirt particles in its stylus-receiving grooves becomes very greatly minimized. The second cause of noise before described becomes thus eliminated, which results in reducing correspondingly the background noise of the record.

It has been pointed out that the behavior of any black in a plastic or rubber is determined by the three fundamental properties of the black: pH, particle diameter, and structure index or the related factor oil absorption index. In the past it was sometimes believed that "the most conductive blacks" would obviously be the most effective in increasing the anti-static properties of articles containing them. This is not so. The phrase "the most conductive blacks" refers to the conductivity of the dry blacks. Different authors describe this as "intrinsic conductivity," "resistivity of dry black," and "dry resistivity." This "intrinsic conductivity" or "dry resistivity" of a dry black, however, can be completely drowned out in vinyl, styrene, rubber, or other high polymers by two other characteristics of the black, namely: particle size, and oil absorption index. In fact, one can say that "dry resistivity" has almost nothing whatever to do with the resistivity of a loaded rubber or plastic; this is all the more true at loadings less than 50 parts per hundred.

This can be seen in Table 7, page 223, of the article in the January 1954 issue of Industrial Engineering Chemistry, entitled "Electrical Conductivity of Rubber-Carbon Black Vulcanizates," by B. S. T. Boonstra and Eli M. Dannenberg, of the Research and Development Laboratories, Godfrey L. Cabot, Inc., Cambridge, Massachusetts. This is reproduced below as Table A.

TABLE A

*Resistivities of dry black and corresponding rubber compounds*

[Apparent density of blacks, 0.52 gram per cc.]

| Black | Particle Diameter, $m\mu$ | Dry Resistivity, ohm-cm. | Resistivity at 50-part Loading in Natural Rubber, ohm-cm. |
|---|---|---|---|
| Sterling S | 80 | 2.0 | $1,000 \times 10^6$ |
| Sterling V | 50 | 0.8 | $100 \times 10^6$ |
| Sterling SO | 40 | 0.8 | $0.5 \times 10^6$ |
| Vulcan 3 | 28 | 0.95 | 2,500 |
| Vulcan C | 26 | 0.54 | 80 |
| Spheron 4 | 24 | 9.1 | $0.2 \times 10^6$ |
| Heat treated Spheron 4 | 24 | 0.3 | 30 |
| Spheron N | 16 | 1.4 | 90 |
| Spheron C | 20 | 2.2 | 1,000 |
| Vulcan SC | 23 | 0.7 | 30 |
| Acetylene | 55 | 0.3 | 80 |

Table A shows that Sterling S has a slightly lower dry resistivity than Spheron C. Yet Sterling S, at 50 parts per hundred loading, provides the polymer with a resistivity *one million times higher* than Spheron C. At lower loadings, of course, the discrepancy will be even greater. On the other hand, Spheron 4 shows a *much* higher value of dry resistivity than Sterling S. Yet Shepron 4 provides the polymer with a resistivity *five thousand times lower* than Sterling S.

Different blacks have different particle diameters, different pH's, different oil absorption indices and different structure indices that produce different effects when incorporated into a record.

Examples of suitable blacks which like graphite may be used for providing conductivity are listed below together with common abbreviations as used herein and in the appended claim.

Channel process gas blacks:
 CC or conductive channel
 HPC or hard processing channel
 MPC or medium processing channel
 EPC or easy processing channel Furnace process oil blacks:
 SAF—Super abrasion furnace
 ISAF—Intermediate super abrasion furnace
 HAF—High abrasion furnace
 CF—Conductive furnace
 ECF—Extra conductive furnace
 SCF—Super conductive furnace
 FEF—Fast extruding furnace or MAF—Medium abrasion furnace: Two different names for the same black
 GPF—General purpose furnace Furnace process gas blacks:
 FF—Fine furnace
 VFF—Very fine furnace
 HMF—High modulus furnace
 SRF—Semireinforcing furnace Thermal process gas blacks:
 FT—Fine thermal
 MT—Medium thermal Lampblack process blacks:
 LB—lampblack Some of this nomenclature is rather arbitrary and is not concurred in by the various carbon black manufacturers. For example one company calls a certain black a CF or, sometimes, SCF black; whereas another company calls an almost identical black an SAF or, sometimes, ISAF black. When a company wishes to emphasize the abrasion-resistance properties of a black, they will call it an SAF black. And when a company wishes to emphasize the electrical conductivity properties of an almost identical black, they will call it a CF or SCF black.

An ISAF furnace process black, like Statex 125, manufactured by Columbian Carbon Co., CC, CF, SCF blacks, and acetylene black, are preferred for minimum loading of the base member to obtain threshold conductivity. When acetylene black is used about 16 to 18 parts to about 68 parts by weight of the black, referred to 100 parts by weight of a suitable base material, is quite satisfactory. When an ISAF furnace process black, like Statex 125, is used, about 18 to 20 parts to about 76 parts by weight of the black is quite satisfactory. Particular additional suitable furnace process blacks, and also suitable channel process and thermal process blacks, will be described more fully hereinafter.

SAF, ISAF, and CF furnace process blacks similar to Statex 125 have a pH of about 8 to 9.5, a mean particle diameter of about 16 $m\mu$ to 23 $m\mu$, where $m\mu$ stands for millimicrons, an oil absorption index in the neighborhood of 125 cc. to 160 cc. per 100 grams, and a structure index in the neighborhood of 115 to 150. Acetylene black is a powdered colloidal carbon which has been described as having a pH of about 5.5 to 6.5, a means particle diameter of about 45 $m\mu$, an oil absorption index of about 320 cc. per 100 grams, and a structure index of about 400.

It should be noted here that a black having a given trade name is often described differently in different publications, either because the properties have actually changed, or because the accuracy of the measurements has improved. An example is Statex M manufactured by the Columbian Carbon Company. This is described in the "Paint, Oil, and Chemical Review," vol. 115, No. 8, p. 22 et seq., April 10, 1952, as being an FEF furnace process black having a particle diameter of 58 $m\mu$, a surface area of 5 acres per pound which is about 35 square meters per gram, an oil absorption index of 15.5 gallons per 100 pounds which is about 130 cc. per 100 grams, a structure index of 180, and a pH of 9.5. Statex M is described in the "Proceedings of the Institution of the Rubber Industry," vol. 2, No. 3, published in 1955, as having a nitrogen-adsorption surface area of 40 square meters per gram, an oil absorption index of 17 gallons per 100 pounds which is about 142 cc. per 100 grams, a structure index of 200, and a pH of 9.

A further example is Vulcan SC manufactured by the Godfrey L. Cabot, Inc., company. This is described in the publication "Cabot Carbon Blacks Under the Electron Microscope," second edition, November 1953, as having a mean particle diameter of 16.2 m$\mu$, a nitrogen-adsorption surface area of 220 square meters per gram, and a pH of 9.5. Vulcan SC is described in the Cabot brochure of January 1955, "Typical Properties of Cabot Rubber Blacks," as having a particle diameter of 21 m$\mu$, a nitrogen-adsorption surface area of 200 square meters per gram, an oil absorption index of 1.50 cc. per gram which is 150 cc. per 100 grams, and a pH of 8. Vulcan SC is described in the January 1954 issue of "Industrial and Engineering Chemistry," vol. 46, p. 218 et seq., in an article by Boonstra and Dannenberg of the Godfrey L. Cabot, Inc., Company, as having an average particle diameter of 23 m$\mu$, a surface area of 200 square meters per gram, and a pH of 8.5.

In this last article in addition acetylene black is described as having an average particle diameter of 55 m$\mu$ and a pH of 5 to 6.

As a further example, Statex 125 has been described as having a particle diameter of 23 to 25 m$\mu$, a structure index of about 150, and a pH of about 8. Additionally, in the October 1952 issue of the "Rubber Age," in an article by C. W. Sweitzer on "The Carbon Gel Complex in the Reinforcement of Rubber," Statex 125 is described as having a particle diameter of 22 m$\mu$, a structure index of 145, and a pH of 8. In the "Proceedings of the Institution of the Rubber Industry," vol. 2, No. 3, referred to above, Statex 125 is described as having a pH of 8, a structure index of 115, and an oil absorption index of 15 gallons per 100 pounds which is about 125 cc. per 100 grams; also a specific surface of 103 square meters per gram which could correspond to a particle diameter of about 22 m$\mu$.

As will be shown later, therefore, it is highly desirable to recommend the suitable proportions of a black in terms of the actual properties of the black rather than by reference to the process by which the black was manufactured, such as furnace process black, channel process black, thermal process black, etc., since these descriptions do not uniquely define the properties of a black.

In addition to the threshold value L, which is a lower limit, an upper limit may also be given for each black. This is discussed below in detail, where it is shown that the upper limit, unlike the lower limit, is a rather arbitrary value determined by how much plasticizer one is willing to use. It is shown that as a rough starting point for determining a usable upper limit, one may choose a value about 4 times the lower limit given for each black.

With some blacks, as for example an SRF furnace process black or an FT thermal process black, as will hereinafter be more fully described, as much as about 100 to about 150 or even 200 parts by weight of the black may be desirable. It is not always possible, furthermore, to predict accurately beforehand, within fixed and non-overlapping limits, the exact proportion of a particular black that should be used, under any and all circumstances. The exact proportion may vary, for example, with the processing, the amount of plasticizer and other ingredients employed, and other factors.

Now, it has been shown above that if acetylene black is used, about 16 to 18 to about 68 parts by weight of the black may be used, referred to 100 parts by weight of vinyl resin base. As an illustration of the working of the L-formula, using the figures from the "Paint, Oil, and Chemical Review" of April 1952 above, where acetylene black is described as having a particle diameter of 45 m$\mu$, a pH of 6.5, an oil absorption index of about 320 cc. per 100 grams, and a structure index of 400, $$L = 136 \cdot \frac{\sqrt[4]{45}}{\sqrt{320} \cdot \sqrt[8]{6.5}} \cdot \sqrt[4]{1 - \frac{1}{2} \log \frac{45}{28}} \cdot \sqrt[8]{\frac{400}{100}} = 18 \text{ parts}$$

Also it has been shown above that if an SAF or ISAF furnace process black like Statex 125 is used, about 18 to 20 parts to about 76 parts by weight of the black may be used. Using the figures from the "Rubber Age" of October 1952 above, we learn that Statex 125 has a particle diameter of 22 m$\mu$, a pH of 8, and a structure index of 145. No oil absorption index is given. The oil absorption index as calculated from the formula:

$$\text{Structure index} = \frac{1}{15} \cdot \text{Oil} \cdot \sqrt{d} \cdot \sqrt{A} \cdot \sqrt{pH}$$

or $$145 = \frac{1}{15} \cdot \text{Oil} \cdot \sqrt{22} \cdot \sqrt{1 - \frac{1}{2} \log \frac{22}{28}} \cdot \sqrt{8}$$

turns out to be 160 cc. per 100 grams. Then the L-formula gives the value L=19 parts.

It is interesting to note that if the other set of data are used, namely, a particle diameter of 23 to 25 m$\mu$ which we will call about 24 m$\mu$, a pH of 8, an oil absorption index of about 125 cc. per 100 grams, and a structure index of 115, the calculated L=21 parts. Thus the two descriptions of Statex 125 recommend threshold loading values or L-values which are within 10% of each other.

If, instead of acetylene black or Statex 125, one should use an HAF furnace process black, or a black manufactured by some other process, having a pH of about 7 to 9, a mean particle diameter of about 28 m$\mu$, an oil absorption index in the neighborhood of 125 cc. per 100 grams, and a structure index of about 135 to 150, about 22 to about 88 parts by weight of the black may be used, referred to 100 parts by weight of base resin containing a major portion of a vinyl resin as above described. Two illustrations of such a black are Philblack-O, manufactured by Phillips Petroleum Co., and Statex R, manufactured by Columbian Carbon Co., having their properties in the above ranges and being used in the above proportions. The L-formula recommends the value L=22½ parts.

If a VFF furnace process black, or a black manufactured by some other process, is used, having a pH of about 9, a mean particle diameter of about 33 m$\mu$, an oil absorption index in the neighborhood of 113 cc. per 100 grams, and a structure index of about 130, about 24 to about 96 parts by weight of black may be used. An illustration is Statex K, manufactured by Columbian Carbon Co., having its properties in the above ranges and being used in the above proportions. The L-formula recommends the value L=23½ parts.

If an HMF furnace process black, or a black manufactured by some other process, is used, having a pH of about 9 to 9.5, a mean particle diameter of about 53 m$\mu$, an oil absorption index in the neighborhood of 88 cc. per 100 grams, and a structure index of about 120, about 30 to about 120 parts by weight of black may be used. An illustration is Statex 93, manufactured by Columbian Carbon Co., having its properties in the above ranges and being used in the above proportions. The L-formula recommends the value L=30 parts.

If an FF furnace process black, or a black manufactured by some other process, is used, having a pH of about 9 to 9.5, a mean particle diameter of about 43 m$\mu$, an oil absorption index in the neighborhood of 80 cc. per 100 grams, and a structure index of about 105, about 30 to about 120 parts by weight of black may be used. An illustration is Statex B, manufactured by Columbian Carbon Co., having its properties in the above ranges and being used in the above proportions. The L-formula recommends the value L=29 parts.

If an FEF furnace process black, or a black manufactured by some other process, is used, having a pH of about 9 to 9.5, a mean particle diameter of about 58 m$\mu$, an oil absorption index in the neighborhood of 133 cc. per 100 grams, and a structure index of about 180, about 26 to about 104 parts by weight of black may be used. An illustration is Statex M, manufactured by Columbian Carbon Co., having its properties in the above ranges and being in the above proportions. The L-formula recommends the value $L=25$ parts.

If an SRF furnace process black, or a black manufactured by some other process, is used, having a pH of about 9 to 10, a mean particle diameter of about 74 m$\mu$ to about 96 m$\mu$, and a structure index of about 105 to 110, the proportion of parts by weight of black to be used will depend upon the oil absorption index, in terms of cubic centimeters per 100 grams, as follows:

For an oil absorption index of about 62 cc. to about 65 cc. per 100 grams, about 43 to 41 parts black is required for the minimum conductivity;

For an oil absorption index of about 65 cc. to about 68 cc. per 100 grams, about 41 to 39 parts black is required;

For an oil absorption index of about 68 cc. to about 72 cc. per 100 grams, about 39 to 37 parts black is required;

For an oil absorption index of about 72 cc. to about 76 cc. per 100 grams, about 37 to 35 parts black is required; and For an oil absorption index of about 76 cc. to about 80 cc. per 100 grams, about 35 to 33 parts black is required.

In all these cases, the proportion may be increased to about 130 parts and even, under certain circumstances, to about 170 parts.

An illustration is Furnex. The pH of Furnex is about 9 to 10, the mean particle diameter is about 85 m$\mu$, the oil absorption index is about 71 cc. per 100 grams, and the structure index is about 105 to 110. The preferred number of parts by weight of Furnex is 38, as determined by experiment. It is interesting to note that the L-formula, which is reliable within $\pm 10\%$, recommends 35 parts Furnex, which is within 10% of the minimum requirement as determined by experiment.

The employment of only 35 parts Furnex has been proved, by experiment, to render the record unsuitable for the antistatic purposes above described. It is, of course, possible, as above stated, to produce records having satisfactory anti-static properties using only 35 or even 33 parts of an SRF furnace process black, but in that event, only with the above-indicated higher oil absorption index.

If a CF furnace process black, or a black manufactured by some other process, is used, having a pH of about 10, a mean particle diameter of about 40 m$\mu$, an oil absorption index in the neighborhood of 80 cc. per 100 grams, and a structure index of about 100, about 30 parts to about 120 parts by weight of black may be used. An illustration is Statex A, manufactured by Columbian Carbon Co., having its properties in the above ranges and being used in the above proportions. The L-formula recommends the value $L=29$ parts.

If a CF furnace process black, or a black manufactured by some other process, is used, having a pH of about 8 to 9.5, a volatile content of about 1.6%, a mean particle diameter of about 16 m$\mu$ to about 23 m$\mu$, an iodine surface area of about 200 square meters, an oil absorption index in the neighborhood of 150 cc. per 100 grams, and a structure index of about 135, about 17½ to 19½ parts to about 74 parts by weight of black may be used. An illustration is Vulcan SC, manufactured by Godfrey L. Cabot Company, having its properties in the above ranges and being used in the above proportions. The L-formula, using a $d$ value of 21 m$\mu$, recommends the value $L=19$ parts. The accuracy of the L-formula can be improved if we note that the product of particle diameter and specific surface is about 4000, which means that the effective particle diameter has a value about 27% less than the nominal 21 m$\mu$, namely about 15½ m$\mu$. The L-formula then recommends a value of 18 parts.

If an ISAF furnace process black, or a black manufactured by some other process, is used, having a pH of about 9 to 9.5, a mean particle diameter of about 17.5 m$\mu$ to about 23 m$\mu$, an oil absorption index in the neighborhood of 137 cc. per 100 grams, and a structure index of about 130, about 18 to 20 parts to about 76 parts by weight of black may be used. An illustration is Vulcan 6, manufactured by Godfrey L. Cabot Company, having its properties in the above ranges and being used in the above proportions. The L-formula recommends the value $L=20$ parts.

If an SAF furnace process black, or a black manufactured by some other process, is used, having a pH of about 8.5 to 9.8, a mean particle diameter of about 13.8 m$\mu$ to about 19 m$\mu$, an oil absorption index in the neighborhood of 151 cc. per 100 grams, and a structure index of about 134, about 17 to 19 parts to about 72 parts by weight of black may be used. An illustration is Vulcan 9, manufactured by Godfrey L. Cabot Company, having its properties in the above ranges and being used in the above proportions. The L-formula recommends the value $L=19$ parts.

These three Cabot blacks, Vulcan SC, Vulcan 6, and Vulcan 9, are seen to have about the same properties as Columbian Carbon Company's Statex 125 which has been described above, and hence have about the same threshold loading value.

If a CF furnace process black is used having a mean particle diameter of about 29 m$\mu$, an iodine surface area of about 210 square meters per gram, an oil absorption index of about 260 cc. per 100 grams, a structure index of about 240 to 275, a volatile content of about 1.8%, and a pH of about 8 to 9, about 15 to about 60 parts by weight of black may be used. The L-formula, if the nominal $d$ value of 29 m$\mu$ were used, would recommend the value $L=17$ parts. But since the product of iodine surface and nominal particle diameter is about 6000, the effective particle diameter has a value about 40% less than the nominal 29 m$\mu$, namely about 18 m$\mu$. Hence the L-formula recommends a value of 15 parts.

The above are examples of furnace process blacks, or blacks manufactured by some other process, having a pH of about 7 to about 10, a mean particle diameter of about 13.8 m$\mu$ to about 85 m$\mu$, an oil absorption index of about 71 cc. to about 260 cc. per 100 grams, and a structure index of about 100 to about 275.

If a channel process black, or a black manufactured by some other process, is used, having a pH of about 3.5 to 4.5, a mean particle diameter of about 19 m$\mu$, an oil absorption index of about 170 cc. per 100 grams, and a structure index of about 100, about 18 to about 72 parts of black may be used. An illustration is Kosmos BB, manufactured by United Carbon Company, having its properties in the above ranges and being used in the above proportions. The L-formula recommends the value $L=18\frac{1}{2}$ parts.

If a channel process black, or a black manufactured by some other process, is used, having a pH of about 4 to 4.5, a mean particle diameter of about 13 m$\mu$, an oil absorption index of about 250 cc. per 100 grams, and a structure index of about 105, about 14 to about 56 parts black may be used. An illustration is Super Spectra, manufactured by Columbian Carbon Company, having its properties in the above ranges and being used in the above proportions. The L-formula recommends the value $L=14$ parts.

If an EPC channel process black, or a black manufactured by some other process, is used, having a pH of about 4.5 to 5, a mean particle diameter of about 29 m$\mu$, an oil absorption index of about 113 cc. per 100 grams, and a structure index of about 100 to 110, about 25 to about 96 parts black may be used. An example is Micronex W-6, manufactured by Columbian Carbon Company, having its properties in the above ranges and being used in the above proportions. The L-formula recommends the value $L=24\frac{1}{2}$ parts.

If an MPC channel process black, or a black manufactured by some other process, is used, having a pH of about 4.4, a mean particle diameter of about 28 m$\mu$, an oil absorption index of about 109 cc. per 100 grams, and a structure index of about 100 to 105, about 25 to about 96 parts of black may be used. An example is Micronex Standard, manufactured by Columbian Carbon Company, having its properties in the above ranges and being used in the above proportions. The L-formula recommends the value $L=24\frac{1}{2}$ parts.

If a CC channel process black, or a black manufactured by some other process, is used, having a pH of about 9, a mean particle diameter of about 28 m$\mu$, an oil absorption index of about 190 cc. per 100 grams, and a structure index of about 200, about 20 to about 80 parts black may be used. An example is Conductex B, manufactured by Columbian Carbon Company, having its properties in the above ranges and being used in the above proportions. The L-formula recommends the value $L=19$ parts.

If a CC channel process black, or a black manufactured by some other process, is used, having a pH of slightly less than 4.5, a mean particle diameter of about 21 m$\mu$, an oil absorption index of about 180 cc. per 100 grams, and a structure index of about 120, about 20 to about 80 parts black may be used. An example is Conductex A, manufactured by Columbian Carbon Company, having its properties in the above ranges, and being used in the above proportions. The L-formula recommends the value $L=19$ parts.

If a CC channel process black, or a black manufactured by some other process, is used, having a pH of about 4.5 to 5, a mean particle diameter of about 16 m$\mu$ to $17\frac{1}{2}$ m$\mu$, an oil absorption index of about 180 cc. per 100 grams, and a structure index of about 105, about 16 to about 64 parts black may be used. An example is Spheron N, manufactured by Godfrey L. Cabot Company, having its properties in the above ranges, and being used in the above proportions. The L-formula recommends the value $L=16\frac{1}{2}$ parts.

The above are examples of channel process blacks, or blacks manufactured by some other process, having a pH in the range of about 3.5 to about 9, a mean particle diameter in the range of about 13 m$\mu$ to about 29 m$\mu$, an oil absorption index of about 109 cc. to about 250 cc. per 100 grams, and a structure index in the range of about 100 to about 200.

In addition, blacks having a pH in the range of about 2.5 to about 3.5 will also produce an anti-static record, but only when used in somewhat higher proportions than the L-formula recommends, on the order of 1.5 times higher. As an example, Neo Spectra Mark III is a channel process black manufactured by the Columbian Carbon Co., having a mean particle diameter of about 18 m$\mu$, an oil absorption index of about 180 cc. per 100 grams, a pH of about 2.8, and a structure index in the neighborhood of 100. The L-formula recommends 20 parts. Experiment has shown this value to be too small, a value of about 28 parts being satisfactory. As a further example, Peerless Mark II Beads is a channel process black manufactured by the Columbian Carbon Co., having a mean particle diameter of about 30 m$\mu$, an oil absorption index in the range of about 113 cc. to 130 cc. per 100 grams, a pH of about 2.8, and a structure index in the neighborhood of 100. The L-formula recommends 24 parts. Experiment has shown this value to be too small, a value of about 34 parts being satisfactory.

In addition to the blacks described above, the invention may be practiced also with the aid of thermal process blacks, although in proportions the lower limits of which are considerably higher than those above described; and also by the aid of specially treated lampblack process blacks.

If an FT thermal process black, or a black manufactured by some other process, is used, having a pH of about 8 to 8.5, a particle diameter of about 150 m$\mu$ to about 179 m$\mu$, an oil absorption index of about 42 cc. per 100 grams, and a structure index of about 65, from about 44 to about 200 parts of black may be used. An example is P-33, manufactured by Thermatomic Carbon Company, having its properties in the above ranges, and being used in the above proportions. The L-formula recommends the value $L=48$ parts.

If an MT thermal process black, or a black manufactured by some other process, is used, having a pH of about 7 to 8.7, a mean particle diameter of about 300 m$\mu$ to about 472 m$\mu$, an oil absorption index of about 34 cc. per 100 grams, and a structure index of about 60, from about 55 to about 250 parts of black may be used. An example is Thermax, manufactured by Thermatomic Carbon Company, having its properties in the above ranges, and being used in the above proportions. The L-formula recommends the value $L=59$ parts.

The above are examples of thermal process blacks, or blacks manufactured by some other process, having a pH of about 7 to about 8.7, a particle diameter in the range of about 150 m$\mu$ to about 472 m$\mu$, an oil absorption index from about 33 cc. to about 42 cc. per 100 grams, and a structure index of about 60 to about 65.

In the case of low oil absorption blacks, on the order of 80 cc. per 100 grams and lower, once the oil absorption index is known the particle diameter is also known, to a fairly good approximation. The reason is that oil absorption index, particle diameter, pH, and structure index are all tied together by the formula:

Normal or supernormal structure index
$$=\frac{1}{15}\cdot\text{Oil}\cdot\sqrt{d}\cdot\sqrt{A}\cdot\sqrt{\text{pH}}$$

or the formula:

$$\text{Subnormal structure index}=\frac{1}{20}\cdot\text{Oil}\cdot\sqrt{d}\cdot\sqrt{A}\cdot\sqrt{\text{pH}}$$

Now in general, a low oil absorption black has an alkaline pH, on the order of 7 to 10; a rather large particle diameter, that is, greater than about 43 m$\mu$; and a structure index either in the normal range, say about 100 to 110, or the subnormal range, say about 60 to 65. In the case of a high oil absorption black, the situation is not so simple since the high oil absorption can be caused independently either by a small particle diameter or by a high structure index. For example, in the case of a high oil absorption black where neither the particle diameter nor the structure index is known, the structure index might perhaps have any value between 100 and 200 and certainly cannot be guessed at.

As an illustration of the working of the formula for low oil absorption blacks, if a black is described only as having an oil absorption index of 41 cc. per 100 grams, it is suspected of being a thermal process black and hence of possessing a sub-normal structure index, say about 65, and a pH of about 9.

$$65=\frac{1}{20}\cdot 41\cdot\sqrt{d}\cdot\sqrt{A}\cdot\sqrt{9}$$

The solution for $d$ is 190 m$\mu$. The literature for thermal process blacks having the above properties describes P-33 as having a particle diameter of about 150 m$\mu$, and Sterling FT as having a particle diameter of about 179 m$\mu$. The formula in this case gives a nearly correct value for the particle diameter.

On the other hand in the case of an SRF furnace process black such as Furnex, having an oil absorption index of about 71 cc. per 100 grams, a structure index of about 105 to 110, a pH of about 8 to 10, and a particle diameter of about 85 m$\mu$, the formula, if we assume we do not know the particle diameter and try to solve for it, gives a too small value for the particle diameter, namely about 70 m$\mu$. This simply bears out the applicant's experience that SRF blacks exhibit odd behavior in many respects, including the fact that the experimental threshold loading value, for these blacks alone, must be about 10% higher than the L-formula recommends. A possible explanation of the unexpected behavior of SRF blacks such as Furnex or Sterling S, is that the distribution curve of particle diameters is much broader than for other blacks.

The following table, Table I, shows the relation that exists between oil absorption index and mean particle diameter $d$ when the oil absorption index is 80 cc. per 100 grams or lower.

ess, and the thermal process, respectively. The blacks tend to have mean particle sizes, pH values, oil absorption indices, and structure indices, resulting from the respective processes of manufacture.

It is possible, however, so to modify a furnace process black that it shall have characteristics similar to those of a channel process black, so that the pH becomes lowered from about 8 to 10 to about 2 to 5. It is possible also to modify a channel process black so that it shall have characteristics similar to those of a furnace process black, the pH becoming raised from about 2 to 5 to about 8 to 10. Some of these modifications are discussed in the Sperberg patent, U.S. 2,657,117, and in the Krejci patents, U.S. 2,616,794, 2,632,713, etc. Additionally, the various Krejci patents teach how to produce

TABLE I

| Black | Name | Oil Absorption Index in cc.-per 100 grams | Actual $d$ in m$\mu$ | Calculated $d$ | Structure Index | pH | Experimental Threshold Loading Value (Parts black per 100 parts vinyl resin base) |
|---|---|---|---|---|---|---|---|
| FF furnace process | Statex B | 80 | 43 | 42 | 100 | 9.3 | 30 |
| SRF furnace process | Furnex | 71 | 85 | 70 | 105 to 110 | 8 to 10 | 38 |
| FT thermal process | P-33 | 42 | 150 | {190 | 65 | 8.5 | {44 |
| FT thermal process | Sterling FT | 41 | 179 |  |  | 8.9 |  |
| MT thermal process | Thermax | 33 | 300 | {350 | 60 | 7 | {55 |
| MT thermal process | Sterling MT | 35 | 472 |  |  | 8.5 |  |

From the table we can extrapolate the result that a black described, for example, only as having an oil absorption index of 65 cc. per 100 grams would have to be an SRF furnace process black. It would probably have a particle diameter slightly greater than 85 m$\mu$. In fact $\sqrt{d}:\sqrt{85}$ as 71:65, so $d \cong 102$ m$\mu$. We can then assume that the structure index is in the range 105 to 110, the pH is in the range 8 to 10, and that in fact this black will behave very similarly to but less efficiently than Furnex which has an experimental threshold value of 38 parts in PVC. The threshold value for this black would therefore be slightly larger than that for Furnex or about 42 parts.

In addition to the blacks described above, if a devolatilized lampblack process black, or a black manufactured by some other process, is used, having a pH of about 3.5 to 5, a particle diameter of about 65 m$\mu$ to 100 m$\mu$, an oil absorption index in the neighborhood of 125 cc. to 135 cc. per 100 grams, and a structure index of about 200, from about 30 to about 132 parts of the lampblack may be used. An example is Lampblack #18, manufactured by Columbian Carbon Company, after it has been devolatilized. When devolatilized Lampblack #18 is used, having a pH of about 5 or greater, a particle diameter of about 100 m$\mu$, an oil absorption index of about 125 cc. per 100 grams, and a structure index of about 200, from about 33 parts to about 132 parts by weight of black are satisfactory. The L-formula recommends the value $L = 33$ parts.

If graphite is used, having, for example, a particle size of 7000 m$\mu$, about 32 parts may be used, though this may be increased to about 150 or even about 300 parts. An example is Madagascar graphite. In the photomicrograph of the resulting record, shown in FIG. 5, the base material is shown white at 2, and the long electric paths of graphite are shown black at 1.

In the past, blacks have been named according to the process of manufacturing them. Thus the channel blacks, the furnace blacks, and the thermal blacks are blacks manufactured by the channel process, the furnace proca furnace-type black or a channel-type black or a thermal-type black by a new process which is neither a furnace process nor a channel process nor a thermal process. Thus the *properties* of a black, rather than the process of manufacture, are the preferred means of identification of any black.

Though it is convenient to continue to refer to the blacks by the nomenclature still used in the art therefore, nevertheless, if two blacks have the same pH, the same particle size, the same oil absorption index, and the same structure index, they will respond in the same proportions, when compounded with vinyl ester or halide, styrene, or other resins, in order to render the record anti-static, irrespective of the processes by which the blacks were originally produced.

In some of the claims, therefore, the blacks will be described by reference to the pH, the particle size, and the oil absorption and structure indices, without reference to the nomenclature describing the process of manufacture of the black, such as the words furnace and channel.

A phonograph playing record manufactured as above described, and as shown, for example, in FIG. 1, will be found to be non-dust-attracting. The volume resistivity $R$ of such a record will range from about $10^{12}$ to $10^{13}$ ohm-cm., down to about $10^2$ ohm-cm. or lower; that is, the log $R$ to base 10, will range from about 12 to 13, down to about 2. It may, indeed, range down to 1.5 or even lower.

FIGURE 6 shows the resistivity curves of four different blacks in vinyl resin base: Spheron N, Statex 125 or Vulcan SC, Furnex, and P-33. It has been found that threshold conductivity sufficient to render a record anti-static occurs when the resistivity is between $10^{12}$ and $10^{13}$ ohm-cm. The experimental threshold loading values are specifically given in FIG. 6. The caluculated L-value agrees in each case within ±10%.

A sandwich-type base may also be employed, comprising a center core of, for example, paper, felted-paper pulp, or the like, and top and bottom layers of a resin of the above-described type. The acetylene black or other suitable black will form its long electric paths, constituted of its before-described long-chain-like conductive aggregates, in all the above-described types of phonograph-record base material.

Though it has been found, in practice, that proportions of acetylene black, Statex 125 and other suitable blacks ranging from about 16 to 18 parts to about 72 parts by weight, referred to 100 parts by weight of base resin containing a major portion of vinyl resin, as above described, are very effective to produce a satisfactory record of the above-described character, these proportions of acetylene black, Statex 125 and other suitable blacks may be varied somewhat outside of those values, in accordance with the particular resin employed, the nature and the amount of additives, the time in excess of ten minutes during which the milling is carried out, the kind and amount of lubricant, and other factors. There must be enough acetylene black, Statex 125 or other suitable black to prevent the record from attracting dirt, dust, lint and similar particles. This sets the lower limit for the range of proportions of the commercially usable acetylene black, Statex 125 or other black employed. If, on the other hand, too much conductive material is added to the base material, the record, as above stated, becomes mechanically weakened and brittle; or the record material becomes too viscous to flow easily in the record press.

It is not essential that the black be disposed throughout the body of the record. It may, for example, be provided in the form of a surface layer, as shown at 3, in FIG. 3 of the drawing or even a subsurface layer, as shown at 4 (FIG. 4). This subsurface layer could be obtained, for example, by pressing three biscuits together: the top layer, base alone; the middle or center-core layer, base plus conductive material; and the bottom layer, base alone. The record as a whole, however, in the absence of the black would be insulating.

In the case of a phonograph playing record manufactured as shown in FIG. 4, the center core will also have a log R ranging from about 12 to 13 down to about 2 or lower, but the top and bottom surfaces will have a log R of about 14 or greater.

Records in accordance with the present invention may be formed by any technique well known in the art. As an illustration, the intermixing of a vinyl halide base material, the black, and the additives may be effected by means of a hot two-roller mill at about 260° F. The sample is milled for about 10 minutes. The batch is cut frequently and refined well. The sample is then cut into sheets about 6" x 12" x 130 mils, which are heated to a temperature of about 290° F. on a hotplate for about 2½ minutes to mature them. The sheets may then be stored until such time as it may be desired to manufacture a record. A sheet may then be preheated to soften it, folded into thirds to form a biscuit about 4" x 6" x .390", and then immediately placed in the record press. The subsequent operations are conventional.

As a further illustration, the intermixing of a vinyl halide base material, the black, and the additives may be effected by means of a Banbury mixer. The materials may be placed in a Banbury mixer which is steam-heated to a temperature of about 290° F. The Banbury rolls may be turned through about 60 turns. The batch may then be removed from the Banbury and run through a hot two-roller mill for about three passes to produce a sheet. The sheet thickness may be about 130 mils. The sheet may then be placed on a hotplate at about 290° F. for about 2½ minutes to soften it. The sheet may then be folded into thirds to form a biscuit. The biscuit may be placed in a steam-heated record press to produce a phonograph record. The biscuit may pressed for about 20 seconds at a pressure of about 2400 to 2700 pounds per square inch. The pressed biscuit may then be water-cooled in the press for about 20 seconds to a final temperature of about 85% F. The finished record may then be removed from the press and trimmed.

In place of all or part of the vinyl halide polymers or copolymers above described, one may use (a) solid polyvinyl aromatic compounds such as polystyrene, polyvinyl toluene, polychlorostyrene, polyalphamethyl styrene, and copolymers of one or more of the monomers of these polymers with themselves or other copolymerizable mono-olefinic compounds such as esters and nitriles of acrylic and methacrylic acid, vinyl carbazole, butadiene, and the like, and (b) polymethylmethacrylate, cellulose ethers and esters, including ethyl cellulose, cellulose acetate, cellulose nitrate and cellulose propionate, or combinations of the same; polyvinyl formals and acetals, or combinations of the same; phenolic-type resins; allyl resins; urea resins; and polyolefines such as polyethylene, including linear polyethylene and polypropylene.

Compounded stocks of styrene resin base or styrene copolymer resin base may be prepared, for example, as follows: 100 pounds of base resin, about 16 to 18 pounds of acetylene black, and 1½ pounds of dibasic lead stearate, to provide a lubricant, are milled on a two-roller mill heated to about 350° F., for about 10 minutes. The batch is cut frequently and refined well. The final milled product is then cut into rectangular sheets about 6" x 12" x 130 mils, which are heated to a temperature of about 300° F. on a hotplate for about 3 minutes to mature them. The sheet may then be stored until it is ready to be pressed into a record. Alternatively a Banbury mixer may be used for the compounding.

Various combinations of the above resins may also be used. Examples of phenolic-type resins are resorcinol-formaldehyde and phenol-chloracetone formaldehyde, as described in Patent 2,072,901, to William Henry Moss, Manufacture of Synthetic Resins, March 8, 1937. Examples of an allyl resin are allyl vinyl ethers of glycerine and of ethylene glycol and triallyl cyanurate, as described by Calvin E. Schildknecht, Vinyl and Related Polymers, John Wiley & Sons, Inc., New York, 1952, pages 618–619. An example of a resin derived from acrylic acid and its derivatives is methyl methacrylate, as appears from pages 179–180 of the same book, and Patent 1,997,572 to Bozetech C. Bren, Sound Record, April 16, 1935. Examples of urea resins are urea-formaldehyde, referring to George Holmes Richter, "Text-Book of Organic Chemistry," John Wiley & Sons, Inc., New York, second edition, 1943, page 222, and polyurea, Patent 2,342,679 to Harald Mediger, Material for Records, February 29, 1944. An example of a polyvinyl formal resin is "Formvar"; an example of a polyvinyl acetal is Alvar; an example of a polyethylene is Alathon-1; an example of a linear polyethylene is Trilok; an example of a polypropylene is Grex, manufactured by W. R. Grace Co.

In addition to these synthetic resins, one may also employ shellac in accordance with the present invention. The proportions of the various blacks to be employed are approximately the same as hereinafter described with the synthetic resins.

The base may be a vinyl resin such as polyvinyl chloride or its copolymers, for example a copolymer the major portion of which consists of vinyl chloride copolymerized with a smaller amount of vinyl acetate or vinylidene chloride. Such a base may be compounded with extenders and fillers as is well known. For example, 100 parts by weight of vinyl resin in the above recipes may be replaced by approximately 90 parts by weight of vinyl resin and 10 parts by weight extender. One such extender may be constituted of the gasoline-insoluble, aromatic-hydrocarbon-soluble resinous extract of pine-wood having the trade name Vinsol resin. The said 100 parts by weight vinyl resin may be replaced also by approximately 65 parts by weight vinyl resin, 10 parts by weight extender, as above described, and 25 parts by weight filler. A suitable filler may be a high-grade (fine)

calcium carbonate. Other modifications in the base may also be made.

In practice, about 1½ parts by weight of dibasic lead stearate or of tribasic lead sulfate may be added for 100 parts by weight of vinyl halide or ester resin to provide a stabilizer and lubricant, as above stated. When the base resin consists of styrene or styrene copolymer, although the use of dibasic lead stearate is not required as a stabilizer, it has been found that by using 1½ parts by weight dibasic lead stearate or other lubricant for 100 parts styrene or styrene copolymer resin, the black may be used in lower proportions than when the dibasic lead stearate or other lubricant is omitted.

With styrene or styrene copolymer as the resin, and with the dibasic lead stearate or other lubricant omitted, about 20 pounds of acetylene black may be used with 100 pounds of the base resin. With 1½ parts dibasic lead stearate or other lubricant included, however, the lower limit of acetylene black to be employed is about 16 to 18 parts, irrespective of whether a vinyl halide or ester resin or styrene or styrene copolymer resin is used as the base. In the case of the other blacks, on the other hand, the lower limits described above as suitable for use with a vinyl halide or ester resin base should be increased by about ten percent when the base is constituted of styrene or styrene copolymer. The upper limits are not so critical as the lower limits.

In the case of an HAF black, for example, the lower limit of black to be employed may be increased from the value about 22 parts, for use with a vinyl halide or ester resin base, to about 24 parts, when the base is constituted of styrene or styrene copolymer. For completeness, the following specifications will also be included, but, for the sake of brevity, the various blacks will be identified by their names and mean particle size only, the other characteristics of these blacks having already been given above.

In the case of an SAF, ISAF, or CF black, having a mean particle diameter of about 19 m$\mu$ to 23 m$\mu$, the lower limit may be increased from about 18 to 20 parts up to about 20 to 22 parts. In the case of a VFF black, having a mean particle diameter of about 33 m$\mu$, the lower limit may be increased from about 24 parts up to about 27 parts. In the case of an HMF black, having a mean particle diameter of about 58 m$\mu$ the lower limit may be increased from about 30 parts up to about 33 parts. The lower limit of the proportion to be used of an FF black, having a mean particle diameter of about 43 m$\mu$ may similarly be increased from about 30 parts to about 33 parts; that of an FEF black, having a mean particle diameter of about 58 m$\mu$, from about 26 parts up to about 29 parts; and that of an SRF black having a mean particle diameter of about 74 m$\mu$ to 96 m$\mu$, from about 33 to 43 parts, as discussed above, to about 37 to 48 parts, respectively, in the various categories before referred to.

The lower limits of the proportion to be used of a CF black, having a mean particle diameter of about 40 m$\mu$, may be increased from about 30 parts to about 33 parts; that of a CF black, having a mean particle diameter of about 16 m$\mu$ to about 23 m$\mu$, from about 17½ to 19½ parts to about 19½ to 21½ parts; that of an ISAF black, having a mean particle diameter of about 17.5 m$\mu$ to about 23 m$\mu$, from about 18 to 20 parts up to about 20 to 22 parts; that of an SAF black, having a mean particle diameter of about 13.8 m$\mu$ to about 19 m$\mu$, from about 17 to 19 parts up to 19 to 21 parts; that of a CF black having a mean particle diameter of about 29 m$\mu$ but an effective particle diameter of about 18 m$\mu$, from about 15 parts to about 17 parts; that of an EPC black, having a mean particle diameter of about 29 m$\mu$, from about 25 parts up to about 28 parts; that of an MPC black, having a mean particle diameter of about 28 m$\mu$, from about 25 parts to about 28 parts; that of a CC black, having a mean particle diameter of about 28 m$\mu$, from about 20 parts up to about 22 parts; that of a CC black having a mean particle diameter of about 21 m$\mu$, from about 20 parts up to about 22 parts; that of Spheron N, having a mean particle diameter of about 16 m$\mu$ to 17½ m$\mu$, from about 16 parts to about 18 parts; that of Kosmos BB, having a mean particle diameter of about 19 m$\mu$, from about 18 to about 20 parts; that of Super Spectra having a mean particle diameter of about 13 m$\mu$, from about 14 parts up to about 16 parts; that of Neo Spectra Mark III having a mean particle diameter of about 18 m$\mu$, from about 28 parts to about 31 parts; and that of Peerless Mark II Beads having a mean particle diameter of about 30 m$\mu$, from about 34 parts to about 37½ parts.

The lower limits of the proportion to be used of an FT thermal process black, having a mean particle diameter of about 150 m$\mu$ to 179 m$\mu$, may be increased from about 44 parts up to about 49 parts; that of an MT thermal process black, having a mean particle diameter of about 300 m$\mu$ to 472 m$\mu$, may be increased from about 55 parts up to about 61 parts; that of an LB lampblack process black, having a mean particle diameter of about 100 m$\mu$, may be increased from about 33 parts up to about 37 parts.

In the case of graphite having a mean particle size of about 7000 m$\mu$, the lower limit may be increased from about 32 parts to about 35 parts.

Mixtures of 2, 3, 4, 5, or more blacks are sometimes desired, as described below. Mixtures can produce good anti-static records. The behavior of mixtures will be described, first, for a mixture of only two blacks. The discussion will be limited to threshold conduction.

Figure 7:
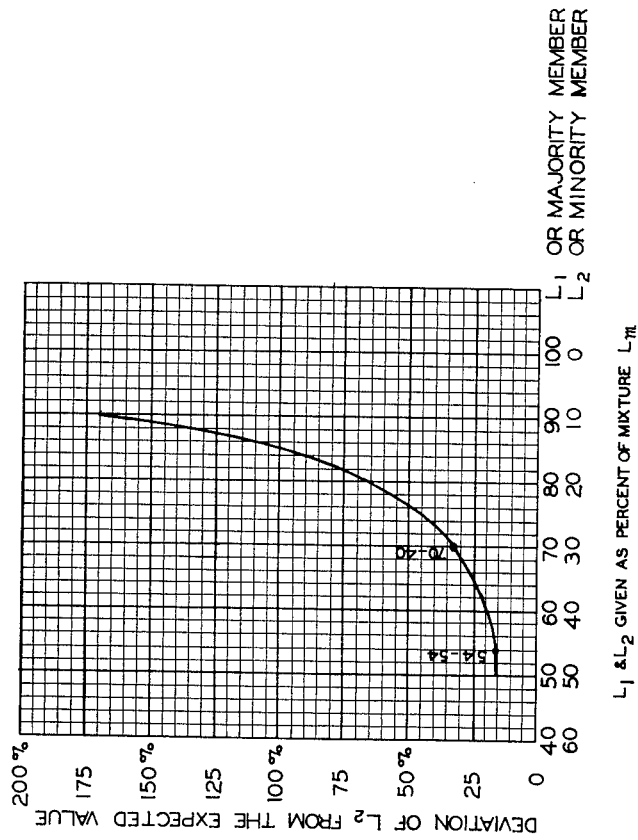

In the first case, the proportions of the two blacks are chosen to have approximately equal percentages of $L_1$ and $L_2$. That is, $L_1$ and $L_2$ are first individually calculated from the respective L-formulas for black 1 and black 2. Then $L_{mixture}$ or $L_m$ is given by: about 58% $L_1$+50% $L_2$; or 50% $L_1$+about 58% $L_2$; or about 54% $L_1$+about 54% $L_2$. It is seen that the particles in a mixture of 2 or more blacks do not cooperate as efficiently as the particles of a single black which would require a value of 100% $L_1$ or 100% $L_2$. In the next case, the proportions of the two blacks are chosen to have unequal percentages of $L_1$ and $L_2$. That is, $L_1$ and $L_2$ are first individually calculated. Then about 70% $L_1$ is chosen. One might expect then to use 30% $L_2$. But because of the inefficiency of cooperation of mixtures, about 40% $L_2$ must be used. This may be called the "minority member" or "weak member" law. Thus the 40% $L_2$ is effective to only about ¾ of its nominal value and is equivalent to 30% $L_1$ when the latter amount is considered as if a second ingredient. When the percentages of the two blacks are even more unequal, the "weak member" is effective only as a smaller and smaller ratio of its nominal value. Thus for example $L_m$ may be given by: about 80% $L_1$+33% $L_2$, the latter being effective only to about 6/10 of its nominal 33% value, which is then equivalent to 20% $L_1$ when the latter amount is considered as if a second ingredient. It should also be noted that if 80% $L_1$+20% $L_2$ were to be used, the 20% $L_2$ would be effective only to about 6/10 of its value which is then equivalent to about 12% $L_1$. The total $L_m$ would thus be equivalent to about 92% $L_1$, which is below the threshold value of 100% $L_1$. Hence such a mixture would fail to render a base resin antistatic. As a further example, $L_m$ may be given by about 90% $L_1$+27% $L_2$, the latter being effective to about ⅜ of its nominal 27% value. FIGURE 7 shows the percent-deviation of the minority member $L_2$ from the expected value.

In the case of mixtures of 3, 4, 5, or more blacks, the "weak member" law is all the more evident. The possible combinations now become multitudinous, so that it is perhaps best to effect conductivity with no more than about 3 blacks, the remaining blacks being used to impart other properties to the record. As an example, if three blacks are used in proportions which are chosen to have approximately equal percentages of $L_1$, $L_2$, and $L_3$, $L_m$ may be given by: about 45% $L_1$+about 45% $L_2$+about 45% $L_3$, each black being effective to only about ¾ of its nominal value.

In some instances, different blacks may be employed in combination to yield combined results that no one black alone could produce. As an illustration, about 20 parts of acetylene black or Statex 125 and about 10 parts of graphite may be employed with 100 parts vinyl resin base, the graphite providing the record material with the additional property of easier flow in the record mold.

As further illustrations, by adding to suitable proportions of the path-forming blacks suitable proportions of suitable path-forming or non-path-forming blacks or other ingredients, it is possible to modify substantially the break-resistant, wear-resistant, plastic flow, and other properties of the record, without modifying its non-dust-attracting characteristics.

For the problem of anti-static records it has been shown that a low level of conduction suffices, a resistivity of $10^{12}$ to $10^{13}$ ohm-cm. being suitable. A resistivity of greater than $10^{13}$ ohm-cm. is found to be inoperative in the present invention. It has been shown that blacks having a pH in the range of about 3.5 to about 10, when used in the proportions recommended by the L-formula, will produce an anti-static record. Moreover, blacks having a pH in the range of about 2.5 to about 3.5 will also produce an anti-static record, but only when used in somewhat higher minimum proportions than the L-formula recommends, about 1.5 times higher. Blacks having a pH of about 2.0 will in general fail to produce an anti-static record, no matter how high the proportions. Such blacks are ordinarily used for pigment purposes.

The question then arises as to what is the best black to use. If a minimum amount of black is desired, the choice would fall upon one of the blacks that impart conductivity to the plastic at low loading values: acetylene black, Statex 125 or Vulcan SC, Spheron N, and the like.

However, since carbon black is relatively cheap, it is sometimes desirable to use it in rather large proportions, as a filler. In this case the choice might fall upon one of the blacks that tend to preserve the plasticity of the record material and the flexibility of the finished record, viz SRF blacks such as Furnex, and thermal blacks such as P-33. (Hence it would not be surprising if the carbon black companies should develop a new carbon which might be named a VFT or very fine thermal carbon, having a particle diameter in the neighborhood of 90 m$\mu$, a pH of about 8, a structure index of about 65, and hence an oil absorption index of about 55 cc. per 100 grams.)

It has been shown above that the lower limit can vary from about 14 parts to about 55 parts black per 100 parts of vinyl halide, vinyl ester, vinyl acetal, styrene, or other resin base. The upper limit, unlike the lower limit has no sudden discontinuity associated with any of its pertinent characteristics, viz: conductivity, plasticity, hardness, brittleness, modulus, etc. Therefore there is no hard and fast value for the upper limit of a black. Furthermore, the factors that tend to set an upper limit, namely increased viscosity of flow of the record material and the associated increased difficulty of processing, as well as increased brittleness of the finished record, can be successfully counteracted by suitable plasticizers, except in the case of blacks having a pH between about 2.0 and about 2.5, a particle diameter in the range 28 m$\mu$ to 13 m$\mu$ or smaller, a structure index of about 100, and an oil absorption index in the range from about 113 cc. to 250 cc. or higher, per 100 grams. Such blacks fail to produce a commercially acceptable record, namely a record which is non-brittle and practical to process when the proportions of black are somewhat higher than the minimum or threshold loading value. Examples of suitable plasticizers are: polyesters, for example various members of the Paraplex family, and octyl phthalates, dibasic lead stearates, tribasic lead sulfates, adipates, etc. In general, the upper limit of a black is arbitrarily determined by how much plasticizer one is willing to use. The disadvantages in the use of too much of certain plasticizers are: the plastic tends to become too "runny" during processing and molding; also, the finished record tends to lose its mechanical rigidity at temperatures somewhat lower than 300° F.

The viscosity of flow of a heated biscuit is one factor that can be used as a yardstick in setting an upper limit, as stated above. However, up to now the record industry has not found a viscosimeter or flow meter which will predict actual molding behavior of a biscuit in the record press. The Rossi-Peakes flow tester, as described in the ASTM Standards on Plastics, May 1954, section D569-48, has been tried, but it is reported that two resins which act almost alike in the record press may have completely different values in the Rossi-Peakes test. Therefore the evaluation of the flow properties of a new resin or a modified resin in the record press is considered, at the present time, an art rather than a quantitative science. For many resins the flow time for 1.5 inches in the Rossi-Peakes flow tester may range from about 1 minute to about 6 minutes. However, resin formulations which have proved suitable for phonograph records may fall outside this range.

Brittleness or its converse, flexibility, may be measured by the angle of bend a record will survive without breaking. A typical test is to first cut the record into two half discs and then to bend a half-disc until it breaks into two quarter discs. In general, a half-disc of an acceptable-thickness record will bend through a 25 or 30 degree angle, that is from an angle of 180 degrees to an angle of 150 or 155 degrees, without breaking. In the appended claims a material of "above minimum flexibility" is one wherein a pressed strip or sheet 12" long and .075" thick will permit movement of edge portions, which are spaced by 12", through an angle of about 30 degrees relative to each other about a round axis (¹⁄₁₆" radius) of bending.

As a rough starting point for determining a usable upper limit, one may choose a value about 4 times the lower limit given for each black, above. Considerable variation around this starting point may then be made, both in respect to increasing the amount of black and in respect to increasing or decreasing the amount of different plasticzers, until the viscosity of flow of a biscuit in the record press falls within the usable range as determined by the judgment of a skilled operator.

It should be pointed out again that plasticizers, in respect to both amount and type, have very little to do with the setting lower limit of a black; but have a great deal to do with setting the upper limit.

I have further discovered that by using a mixture of 2, 3, 4 or more blacks in conjunction with a proper amount and kind of plasticizer that a very fine control may be exercised over such properties as viscosity of flow, brittleness, wear-resistance, etc., while yet retaining the anti-static properties of the record. Mixtures are especially useful when it is desired to use a relatively large proportion of black, as a filler. There is some evidence to show that for a loading below the threshold of conductivity of a black, even though the loading of the black is fairly high, the tendency toward brittleness is somewhat less than when conductivity is attained. Presumably this has to do with the carbon particles being isolated from each other by a resin matrix, thereby improving flexibility. Mixtures are therefore capable of high loading with less tendency toward brittleness, presumably since the particles in a mixture especially tend to remain isolated from each other.

It is to be understood that the descriptions given above of the manufacture of a playing record in accordance with the present invention has contained only the essential features of novelty and that, in actual practice, additional manipulations will be required, as is well known in the art. Reference has been made above, as an illustration, to the use of suitable plasticizers, pigments, binders, fillers, extenders, stabilizers, lubricants, dyes and other additives. Of these, the plasticizers and lubricants are extremely important as to the rigidity or plasticity of the finished record. In general, as the proportions of a black are increased above the minimum values, as described herein, the proportion of plasticizer and lubricant should be simultaneously increased, at about the same rate. For example, if, say, two parts of a plasticizer, such as Paraplex G-62 or G-53, is suitable for use with 22 parts of Statex 125, in combination with 100 parts of vinyl resin, then four parts of Paraplex G-62 or G-53 would be desirable for use with 44 parts of Statex 125. The use of plasticizers and lubricants is particularly desirable in connection with styrene and styrene copolymer resins which are normally quite brittle.

The evolution of the L-formula will now be briefly discussed. I was aware of the general existence of the L-formula as soon as the data in Table II were obtained. Table II shows the proportions of black claimed as a lower limit (now called the L-values) and the approximate oil absorption index values (whenever possible) for each type of black claimed in Serial No. 312,294, including furnace blacks, channel blacks, thermal blacks, lampblack, and acetylene black. It was readily apparent that L was being controlled by some function of $$\frac{1}{\text{Oil}}$$

Figure 8:
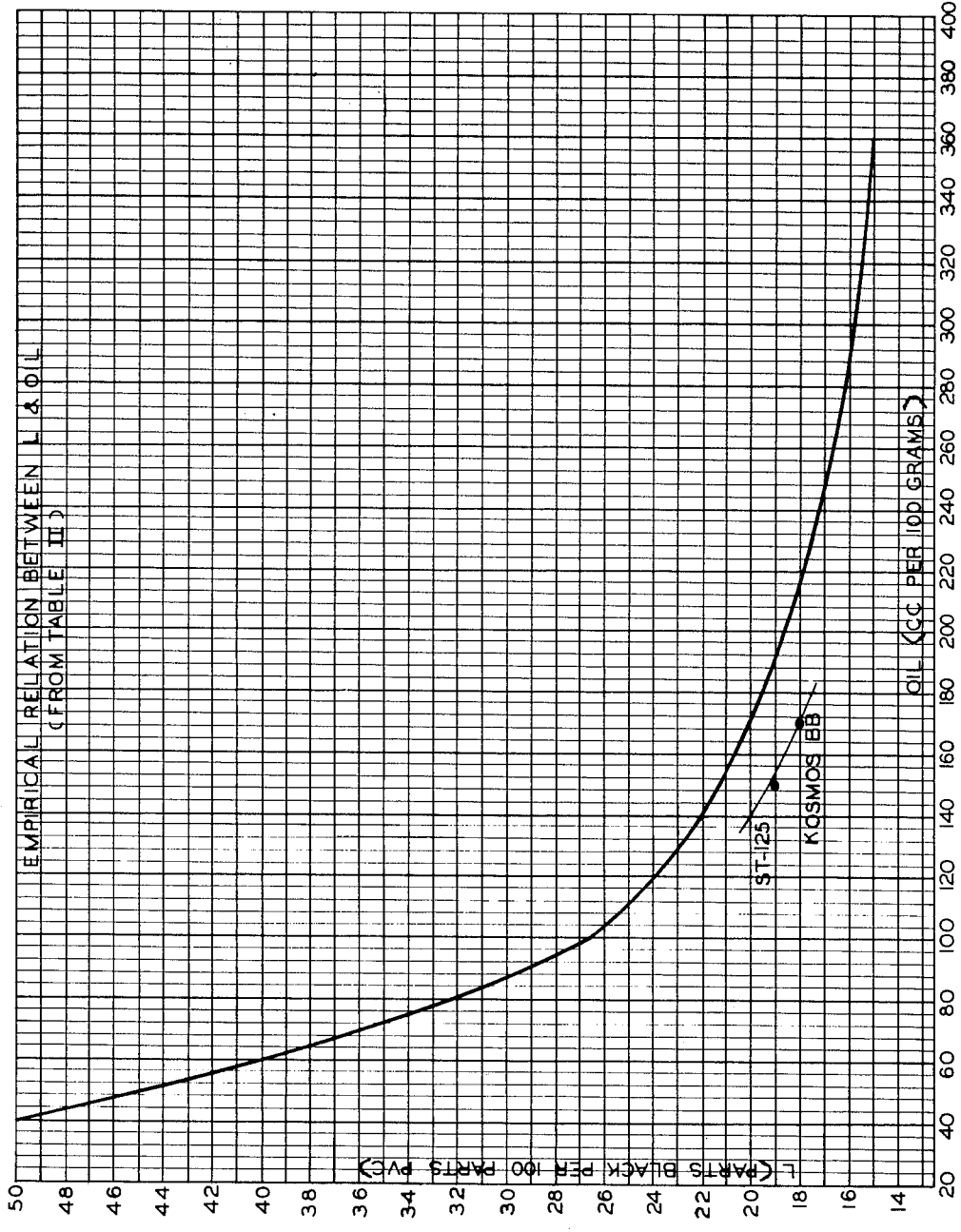

FIGURE 8 is a graphical translation of Table II into a single curve. Some blacks were at first omitted, including Statex 125, since their oil value was not known. The datum point for Lampblack #18 was ignored because its behavior was at first judged to be anomalous. From the data in Table II (and its equivalent, FIG. 8), an attempt was made to express L vs. Oil by a single equation. This resulted in "the 260-rule," which said that $L \times \sqrt{\text{Oil}}$ was approximately equal to 260. The rule was roughly correct for a number of blacks and plotted into a curve which agreed quite closely with the empirical curve. Both curves showed the road that L vs. Oil would have to follow with new blacks. But the 260-rule was considered not universal enough. The two data points that were the most disturbing were Kosmos BB, having the smallest particle diameter, and Lampblack #18, having one of the largest particle diameters. It was therefore felt that a proper formula should include $d$ explicitly, even though $d$ might be already contained in the oil absorption index. That is, the formula sought for should be of the form:

$$L = 260 \cdot \frac{\text{function of } d}{\sqrt{\text{Oil}}}$$

since I knew that in general L should decrease as $d$ decreases. This modified formula would simply drop the whole curve, to land on Kosmos BB ($d=19$ m$\mu$); or raise the whole curve, to land on Lampblack #18 ($d=100$ m$\mu$.

Attention was now concentrated on small diameter blacks as being the most likely to reveal the correct function of $d$. An attempt was made to place Statex 125 in its proper place in the plane. Since its structure index was given as 150, a crude estimate was made that its oil absorption index would also be about 150; $d$ had been given as about 23 to 25 m$\mu$. The experimental L had been given as 19. The position of the datum point for Statex 125 proved to be consistent with the general prediction of the modified formula, namely that Statex 125 and Kosmos BB should lie on an auxiliary curve parallel to, but lower than, the empirical "master curve."

Figure 9:
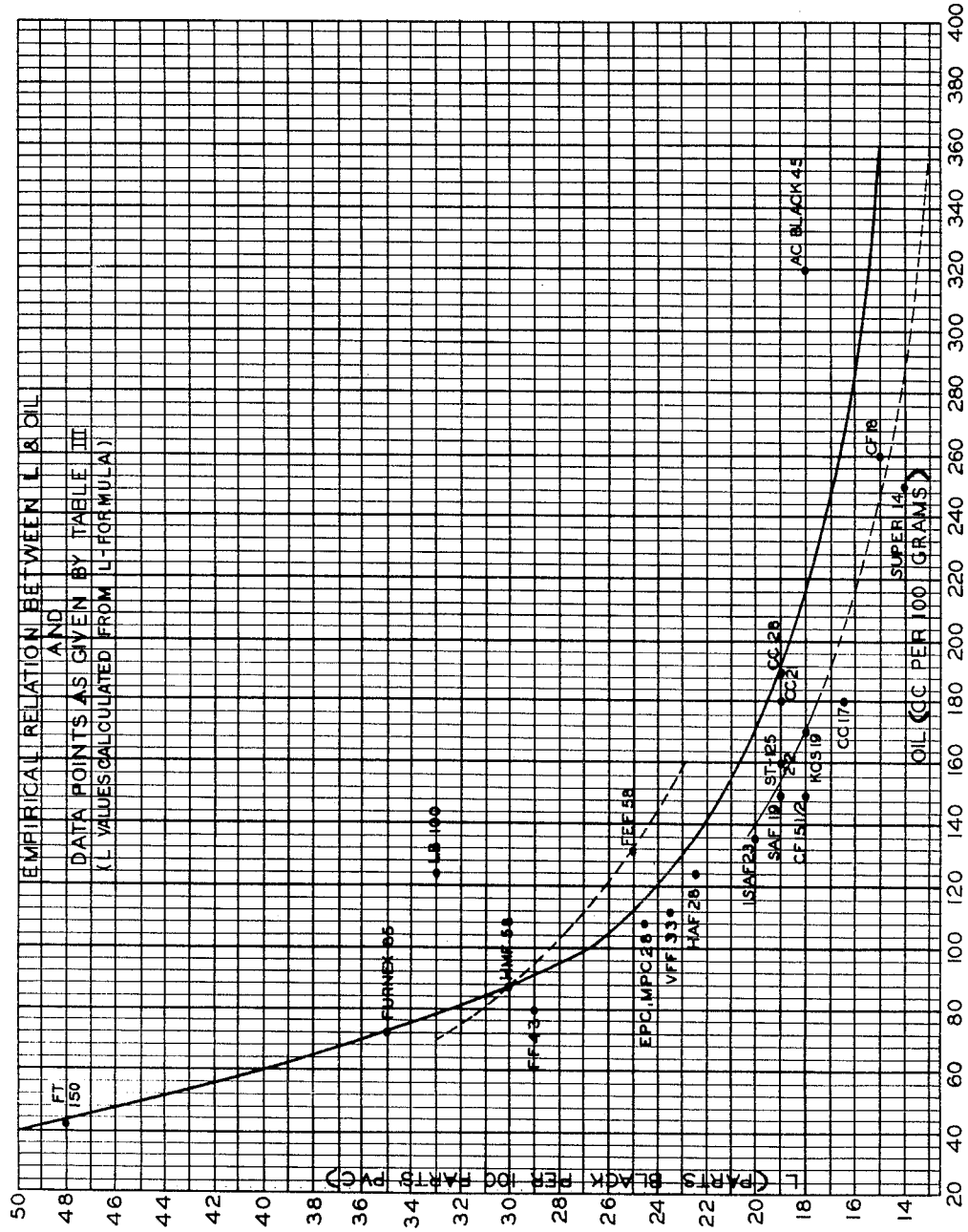

At this point it was considered desirable to re-do some of the experimental measurements and all of the calculations with improved accuracy, and also to use additional blacks, in an attempt to produce an accurate L-formula that would cover all blacks by a single equation. FIGURE 9, based on Table III, shows the result: a main curve which is identical with the "master curve" of FIG. 8, but including a number of new data points; and some auxiliary curves.

FIGURE 9 contributed only corroborative information: that the "master curve" was built around blacks having a $d$ of about 28 m$\mu$, when the Oil values were about 140 and higher, as was suspected from FIGURE 8. The auxiliary curve containing Statex 125 and Kosmos BB was now confirmed, and was strengthened by additional data points having a $d$ in the range 19 m$\mu$ to 23 m$\mu$. Calling the average $d$ about 21 m$\mu$ for this group, it appeared that a change in $d$ from about 28 to 21, a 25% drop, caused a change in L from about 20 to 18, a 10% drop. Thus the "function of $d$" appeared to be $$\sqrt[3]{d/28}$$

and hence L appeared to be $$\frac{260}{3} \cdot \frac{\sqrt[3]{d}}{\sqrt{\text{Oil}}}$$

This formula was still not universal enough. For example, $$\sqrt[3]{d}$$

did not work when $d$ was 45 m$\mu$ and larger. Modifications were required, making use of the pH, the structure index, and a correction factor A for particle diameter, as well as precautions to assure that the "mean particle diameter" used in the final L-formula was actually the *effective* mean particle diameter (especially in the case of blacks of high particle porosity). The final L-formula of course was:

$$L = 136 \cdot \frac{\sqrt[4]{d}}{\sqrt{\text{Oil}} \cdot \sqrt[8]{\text{pH}}} \cdot \sqrt[4]{A} \cdot \sqrt[8]{B}$$

This formula predicts threshold values correctly within at least ±10%. The empirical "master curve" of FIG. 8 is still the best single curve to summarize the dependence of L on Oil, and to act as a point of departure for variations in $d$, pH, and structure index.

To recapitulate, Table II contains a summary of the data disclosed in application Serial No. 312,294. Table III contains a summary of the data disclosed in the present application. FIGURE 8 is a graphical representation of the L vs. Oil data given in Table II. FIGURE 9 consists of the same curve as FIG. 8 and in addition the calculated L vs. Oil data points taken from Table III. These data points are indicated together with their particle diameter values (corrected for iodine surface in two cases). In Table II and elsewhere, "mean particle diameter" $d$ refers to the mean *physical* diameter of the particle. The term "effective particle diameter" refers to $d$ as modified by the iodine surface correction factor only. The correction factor $$\sqrt[4]{A}$$

is treated as an independent and additional factor.

TABLE II

[Data from application Serial No. 312,294]

| Black | Threshold Loading Value L (Parts black per 100 parts PVC) | Oil Absorption Index in cc. per 100 grams | Mean Particle Diameter $d$ in m$\mu$ | pH | Structure Index | Percent Volatile Content |
|---|---|---|---|---|---|---|
| Acetylene Black | 18 | 360 | 45 | 6.5 | 400 | 0.3 |
| Statex 125 | 19 | | 23 to 25 | 8 | 150 | |
| HAF | 22 | 140 | 28 | 8 | 150 | 1.0 |
| VFF | 22 | 130 | 33 | 9 | 130 | 0.5 |
| HMF | 26 | 100 | 58 | 9 | 120 | 0.5 |
| FF | 24 | 90 | 43 | 9 | 100 | 0.5 |
| FEF | 25 | 150 | 58 | 9 | 180 | 0.3 |
| SRF | 30 | 80 | 85 | 10 | 105 | 0.5 |
| CF | 24 | | 40 | 10 | 100 | |
| Kosmos BB | 18 | 170 | 19 | 4 to 5 | 100 | 5 to 10 |
| EPC | 26 | 130 | 29 | 5 | 110 | 5 to 10 |
| MPC | 26 | 125 | 28 | 4.5 | 100 | 5 to 10 |
| CC | 20 | | 28 | 9 | 200 | 0.3 to 1.0 |
| CC | 22 | | 21 | 4.5 | 120 | 5 to 10 |
| FT | 40 | 60 | 100 | 8 | 65 | 0.3 |
| MT | 50 | 40 | 300 | 7 | 60 | |
| LB | 28 | 140 | 100 | 5 | 200 | |

TABLE III

[Data from present application]

| Black | Threshold Loading Value L (Parts black calculated from L-formula for 100 parts PVC) | Threshold Loading Value L used in practice | Oil absorption index in cc. per 100 grams | Mean physical particle diameter $d$ in m$\mu$ | Effective particle diameter due to iodine surface correction (same as $d$ unless specified) | pH | Structure Index | Percent Volatile content |
|---|---|---|---|---|---|---|---|---|
| Acetylene Black | 18 | 16 to 18 | 320 | 45 | | 6.5 | 400 | 0.3 |
| Statex 125 | 19 | 18 to 20 | 160 | 22 | | 8 | 145 | 1.0 |
| HAF | 22½ | 22 | 125 | 28 | | 7 to 9 | 135 to 150 | 1.0 |
| VFF | 23½ | 24 | 113 | 33 | | 9 | 130 | 0.5 |
| HMF | 30 | 30 | 88 | 58 | | 9 to 9.5 | 120 | 0.5 |
| FF | 29 | 30 | 80 | 43 | | 9 to 9.5 | 105 | 0.5 |
| FEF | 25 | 26 | 130 | 58 | | 9 to 9.5 | 180 | 0.3 |
| Furnex | 35 | 38 | 71 | 85 | | 9 to 10 | 105 to 110 | 0.5 |
| CF | 29 | 30 | 80 | 40 | | 10 | 100 | |
| CF | 18 | 17½ | 150 | 21 | 15½ | 8 to 9.5 | 135 | 1.6 |
| ISAF | 20 | 18 to 20 | 137 | 23 | | 9 to 9.5 | 130 | 1.0 |
| SAF | 19 | 17 to 19 | 151 | 19 | | 8.5 to 9.8 | 134 | 1.5 |
| CF | 15 | 15 | 260 | 29 | 18 | 8.5 | 240 to 275 | 1.8 |
| Kosmos BB | 18½ | 18 | 170 | 19 | | 3.5 to 4.5 | 100 | 5 to 10 |
| Super Spectra | 14 | 14 | 250 | 13 | | 4 to 4.5 | 105 | 8 |
| EPC | 24½ | 25 | 113 | 29 | | 4.5 to 5 | 100 to 110 | 5 |
| MPC | 24½ | 25 | 109 | 28 | | 4.4 | 100 to 105 | 5.5 |
| CC | 19 | 20 | 190 | 28 | | 9 | 200 | |
| CC | 16½ | 16 | 180 | 17 | | 4.5 to 5 | 105 | 5 |
| CC | 19 | 20 | 180 | 21 | | 4.5 | 120 | |
| FT | 48 | 44 | 42 | 150 | | 8 to 8.5 | 65 | 0.3 |
| MT | 59 | 55 | 34 | 300 | | 7 to 8.7 | 60 | 0.5 |
| LB | 33 | 33 | 125 | 100 | | 5 | 200 | |
| | L×1.5 | | | | | | | |
| Neo Spectra Mark III | 30 | 28 | 180 | 18 | | 2.8 | 100 | 13 |
| Peerless Mark II | 36 | 34 | 113 to 130 | 30 | | 2.8 | 100 | 13 |

In the appended claim the minimum loading valve L refers to the *calculated* value as given by the L-formula. The L-formula can be written in two ways:

$$L = 136 \cdot \frac{\sqrt[4]{d}}{\sqrt{\text{Oil}} \cdot \sqrt[8]{\text{pH}}} \cdot \sqrt[4]{A} \cdot \sqrt[8]{B}$$

or, $$L = 136 \cdot (d \cdot A)^{1/4} \cdot B^{1/8} \cdot \text{Oil}^{-1/2} \cdot \text{pH}^{-1/8}$$

where $$\sqrt[8]{\phantom{x}}$$

or $(\ )^{1/8}$ simply means:

take the square root of the square root of the square root. In the L-formula $d$ means the effective particle diameter, as modified by the iodine surface factor only. Note that "$d$" as used here may or may not be identical with the mean physical particle diameter, as described above.

In the case of mixtures the amount of the black is increased as before noted by at least 16% and usually by at least 20% of the member present in smallest amount. In the case of a mixture of two blacks present in about equal amounts, the deviation shown in FIGURE 7 shall be the deviation of a 50–50 mixture namely +8% for *each* component, resulting in a 54–54 mixture.

The adjusted L-formula is called the $L_a$-formula and describes in mathematical language what was previously described by a combination of words and mathematics.

$$L_a = 136 \frac{\sqrt[4]{d}}{\sqrt{\text{Oil}} \cdot \sqrt[8]{\text{pH}}} \cdot \sqrt[4]{A} \cdot \sqrt[8]{B} \cdot C^1 \cdot C^2 \cdot C^3 \cdot C^4$$

Here, $C_1$ is the parameter which takes account of the resin, being 100% for vinyl halides and esters and other resinous polymers of a monoethylenically unsaturated monomer, with the exception of styrene and styrene copolymers which require a value of 110% for. $C_1 \cdot C_2$ is the parameter which takes account of mixtures of two or more blacks, being 100% when only one black is used but being for example 54% for each constituent black, when equal percentages of two blacks are indicated; and being further varied according to the functional relationships given by FIGURE 7 and by the discussion on mixtures given above. $C_3$ is the parameter which takes account of semireinforcing furnace blacks, being 100% for all other blacks but 110% for semireinforcing furnace blacks. $C_4$ is the parameter which takes account of thermal process blacks, being 100% for all other blacks but 90% for thermal process blacks.

The term "a non-aromatic vinyl resin" is meant to include vinyl halides, vinylidene halides, vinyl esters, vinyl acetals, etc., and to exclude styrenes.

Further modifications will occur to those skilled in the art and all such are considered to fall within the spirit and scope of the invention, as defined in the appended claim.

I claim:

An article of manufacture comprising a conductive phonograph record comprising a disc at least seven inches in diameter, about one-sixteenth of an inch thick and defining a central aperture and grooves on both faces, said disc composed of a homogeneous composition at least 90% of which consists of 100 parts of a compound of a thermoplastic polymer of a monoethylenically unsaturated monomer, and carbon particles having a diameter of from about 13 millimicrons to about 470 millimicrons and having a pH of from about 3.5 to about 10, said carbon particles being present from about $L_a$ to about $4L_a$ parts per 100 parts of said compound where $$L_a = K \frac{\sqrt[4]{d}}{\sqrt{\text{Oil} \cdot \sqrt[8]{\text{pH}} \text{ of carbon particles}}} \cdot \sqrt[4]{A} \cdot \sqrt[8]{B}$$

wherein K is a number between about 120 and about 190, $d$ is the effective carbon particle diameter in millimicrons, Oil is the oil absorption index of the carbon particles, $$A = 1 - \frac{1}{2} \log_{10} \frac{d}{28}$$

and $$B = \frac{\text{structure index}}{100}$$

of the carbon particles where structure index $= k \cdot \text{Oil} \cdot \sqrt{d} \cdot \sqrt{A} \cdot \sqrt{\text{pH}}$ wherein $k$ equals 1/15 for a structure index greater than about 90 and equals 1/20 for a structure index less than about 90, said phonograph record being non-conductive in the absence of said carbon particles.

References Cited in the file of this patent

UNITED STATES PATENTS

| | | |
|---|---|---|
| 2,157,697 | Hagedorn | May 9, 1939 |
| 2,206,636 | Hunter | July 2, 1940 |
| 2,269,267 | Hunter | Jan. 6, 1942 |
| 2,619,440 | Lord | Nov. 25, 1952 |

FOREIGN PATENTS

| | | |
|---|---|---|
| 620,604 | Great Britain | Mar. 28, 1949 |

OTHER REFERENCES

Sweitzer et al.: Carbon Spectrum, "The Rubber Age," volume 55, No. 5, August 1944, pages 469–478.

UNITED STATES PATENT OFFICE
CERTIFICATE OF CORRECTION

Patent No. 2,997,451                                            August 22, 1961

Harry B. Miller

It is hereby certified that error appears in the above numbered patent requiring correction and that the said Letters Patent should read as corrected below.

Column 4, lines 21 and 22, for that portion of the formula reading $$\overline{\text{Oil}} \quad \text{read} \quad \sqrt{\text{Oil}}$$

Signed and sealed this 24th day of April 1962.

(SEAL)
Attest:

ESTON G. JOHNSON                                        DAVID L. LADD
Attesting Officer                                            Commissioner of Patents